(12) United States Patent
Boyer et al.

(10) Patent No.: US 6,578,258 B1
(45) Date of Patent: Jun. 17, 2003

(54) PIERCE NUT INSTALLATION HEAD

(75) Inventors: Mark S. Boyer, Carsonville, MI (US); John Zak, Trenton, MI (US)

(73) Assignee: Whitesell of Michigan Inc., Ann Arbor, MI (US)

( * ) Notice: Subject to any disclaimer, the term of this patent is extended or adjusted under 35 U.S.C. 154(b) by 0 days.

(21) Appl. No.: 10/155,708

(22) Filed: May 24, 2002

(51) Int. Cl.[7] ................................................. B23P 19/00
(52) U.S. Cl. ........................... 29/798; 29/818; 29/432.2
(58) Field of Search .......................... 29/798, 788, 818, 29/243.5, 505, 509, 432.2; 227/120, 135, 136

(56) References Cited

U.S. PATENT DOCUMENTS

| | | |
|---|---|---|
| 739,992 A | 9/1903 | Davidson et al. |
| 1,728,203 A | 9/1929 | Clouse |
| 2,120,711 A | 6/1938 | Phillips |
| 2,936,802 A | 5/1960 | Skoog |
| 2,937,734 A | 5/1960 | Sommer |
| 3,098,576 A | 7/1963 | Steward |
| 3,108,368 A | 10/1963 | Steward |
| 3,152,628 A | 10/1964 | Strain et al. |
| 3,563,087 A | 2/1971 | Brunelle et al. |
| 3,583,201 A | 6/1971 | Topaz |
| 3,618,396 A | 11/1971 | Julien |
| 3,718,965 A | 3/1973 | Steward |
| 3,726,000 A | 4/1973 | Hafner |
| 3,791,191 A | 2/1974 | Baldyga |
| 3,800,643 A | 4/1974 | Scott et al. |
| 3,810,290 A | 5/1974 | Grube |
| 3,811,171 A | 5/1974 | Grube |
| 3,845,860 A | 11/1974 | Ladouceur et al. |
| 3,878,598 A | 4/1975 | Steward |
| 3,930,248 A | 12/1975 | Keller |
| 3,942,235 A | 3/1976 | Goodsmith et al. |
| 3,946,478 A | 3/1976 | Goodsmith et al. |
| 3,946,479 A | 3/1976 | Goodsmith et al. |
| 3,948,077 A | 4/1976 | Bothe |
| 3,961,408 A | 6/1976 | Goodsmith et al. |
| 3,969,808 A | 7/1976 | Goodsmith et al. |
| 3,971,116 A | 7/1976 | Goodsmith et al. |
| 4,030,336 A | 6/1977 | Grigorenko et al. |
| 4,096,798 A | 6/1978 | Moskalik |
| 4,153,989 A | 5/1979 | Shinjo |
| 4,164,072 A | 8/1979 | Shinjo |
| 4,202,433 A | 5/1980 | Baltschun |
| 4,203,187 A * | 5/1980 | Grube ........................ 29/283.5 |
| 4,242,158 A | 12/1980 | Olson |
| 4,242,793 A | 1/1981 | Matthews et al. |
| 4,320,707 A | 3/1982 | McIlrath |
| 4,340,326 A | 7/1982 | Buonauro et al. |
| 4,384,667 A | 5/1983 | Smallegan et al. |
| 4,475,403 A | 10/1984 | Lentz |
| 4,574,473 A * | 3/1986 | Sawdon ........................ 29/798 |
| 4,649,753 A | 3/1987 | Goodsmith |
| 4,700,470 A | 10/1987 | Muller |
| 4,858,289 A | 8/1989 | Speller, Sr. |
| 4,998,659 A | 3/1991 | Goodsmith et al. |
| 5,743,003 A * | 4/1998 | Shinjo ........................ 29/798 |
| 5,813,114 A * | 9/1998 | Blacket et al. ................ 29/809 |
| 6,108,893 A | 8/2000 | Wojciechowski et al. |
| 6,226,854 B1 | 5/2001 | Ladouceur |
| 6,446,833 B1 * | 9/2002 | Morishima et al. ........... 29/798 |

FOREIGN PATENT DOCUMENTS

WO    WO 02/18074    10/2000

* cited by examiner

*Primary Examiner*—David P. Bryant
(74) *Attorney, Agent, or Firm*—Brinks Hofer Gilson & Lione

(57) ABSTRACT

A pierce nut installation head for installing a pierce nut onto a sheet metal panel. The installation head is mounted to a press which compresses the installation head against the sheet metal panel. This process causes a plunger to drive a pierce nut into engagement with the sheet metal panel for installation. The installation head provides improvements in terms of its compactness, number of components, and ease of servicing.

18 Claims, 7 Drawing Sheets

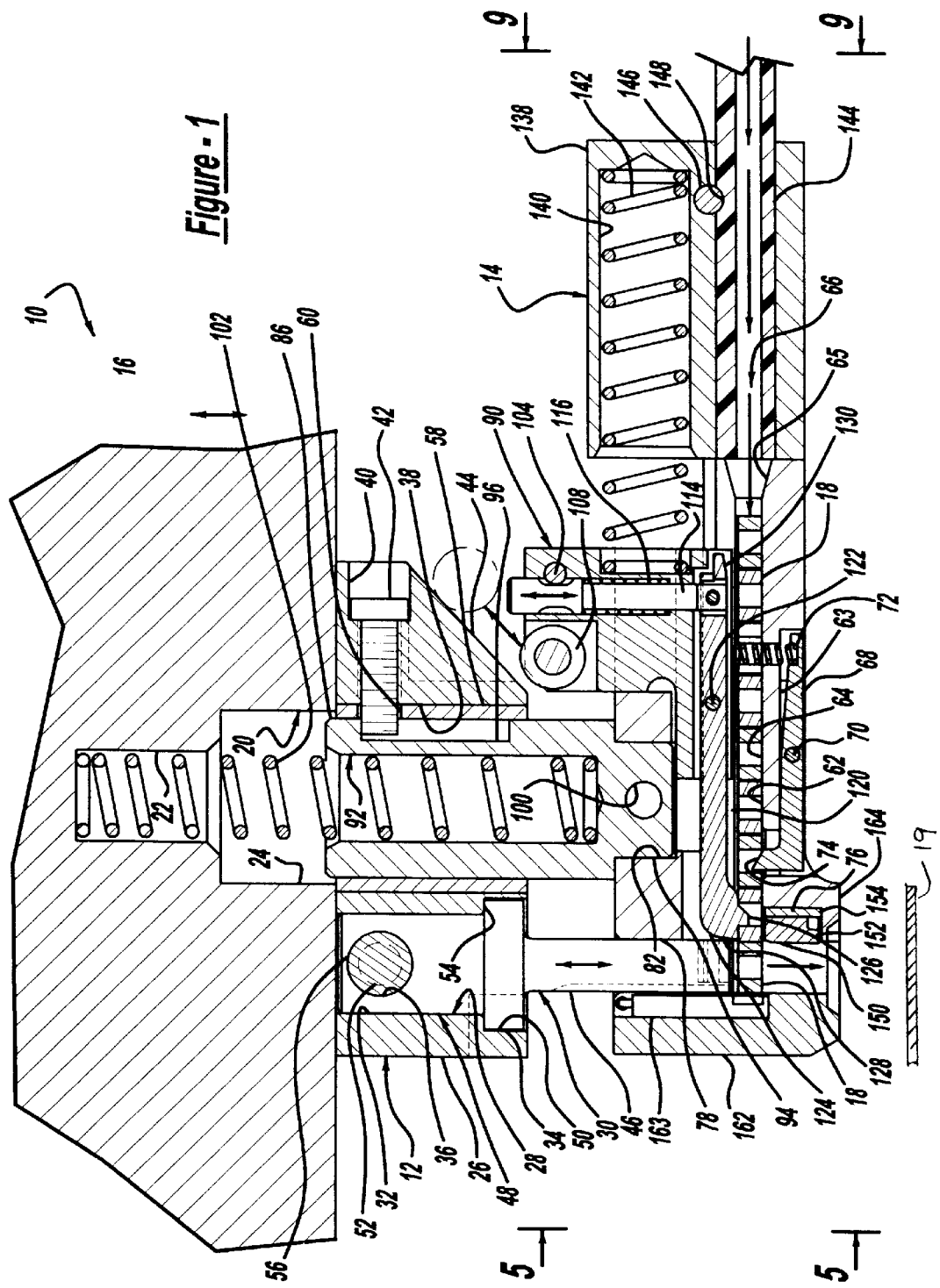

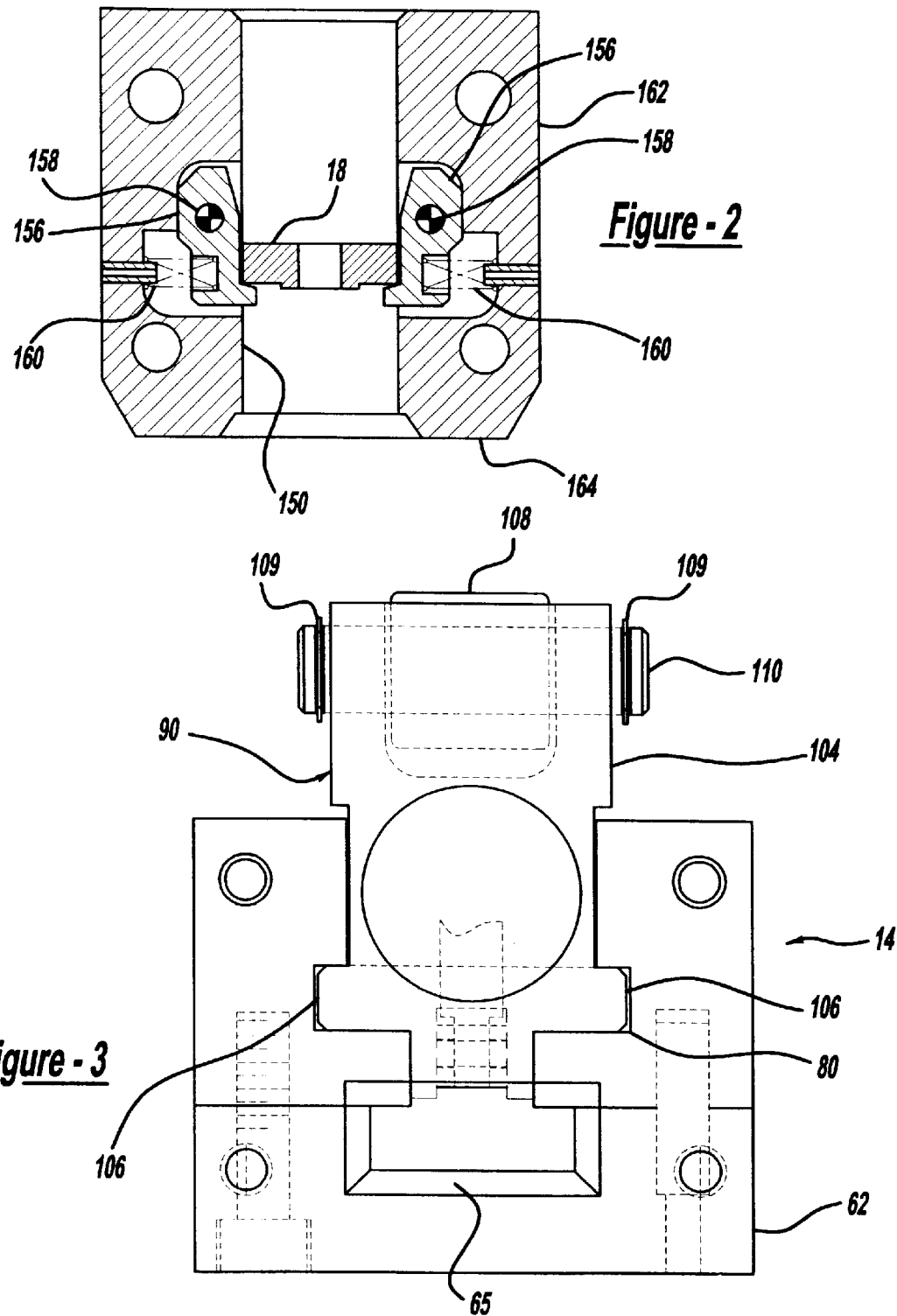

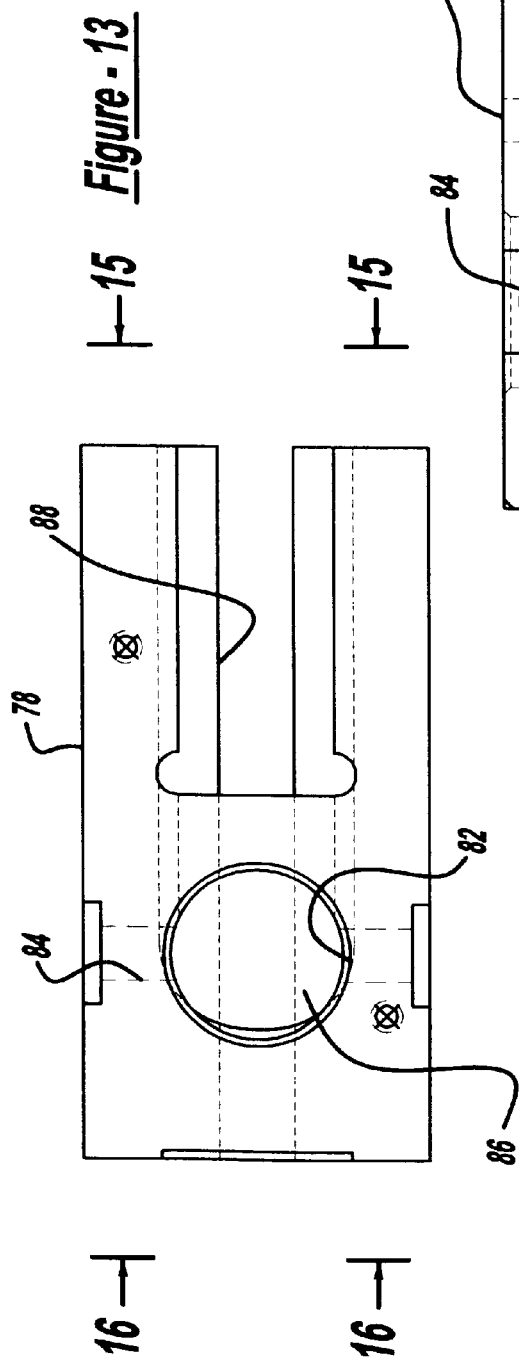
*Figure - 13*
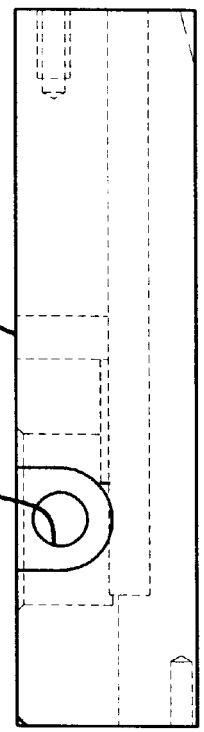
*Figure - 14*
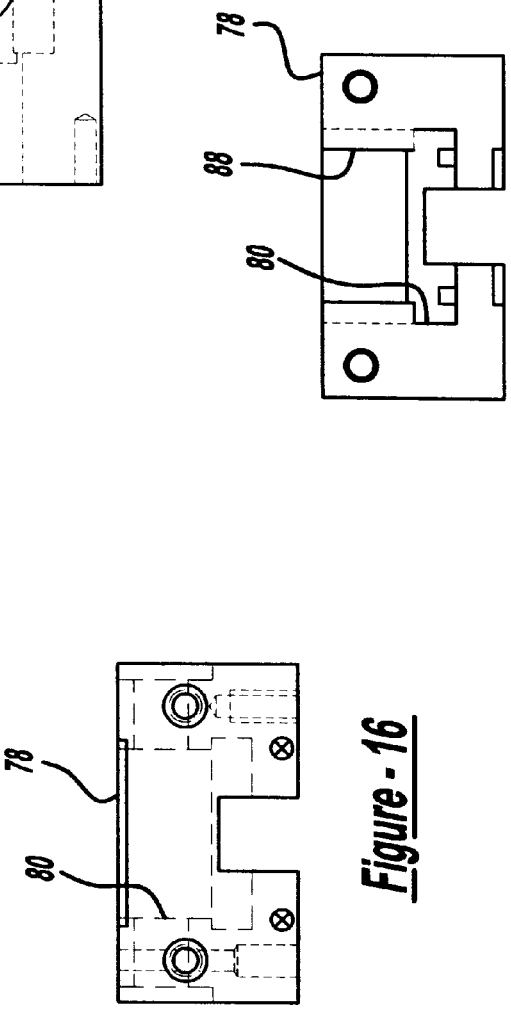
*Figure - 15*
*Figure - 16*

PIERCE NUT INSTALLATION HEAD

FIELD OF THE INVENTION

This invention relates to a pierce nut installation head used for attaching pierce nuts to sheet metal or other material panels.

BACKGROUND AND SUMMARY OF THE INVENTION

Pierce nuts are used in numerous types of equipment. These threaded fastener nuts become attached to a sheet metal panel and are installed in the sheet metal panel through use of a pierce nut installation tool or head. The pierce nut installation head is positioned in a die or fixture having upper and lower platens. A sheet metal panel is positioned between the die platens and when the platens are stroked to move toward one another, the pierce nut installation head positioned within the die cavity dispenses a nut and causes the nut to be installed onto the sheet metal panel. The pierce nut is typically provided in a strip of multiple pierce nuts held together by a retainer, such as a length of wire or other connecting element. Pierce nuts are typically square or rectangular in shape and usually have an internal threaded hole, or an unthreaded hole to accept a thread forming fastener. The pierce nut is forced against the sheet metal panel and the pilot of the pierce nut engages and pierces a hole through the panel in the manner of a blanking operation. The pilot of the pierce nut is then forced into the opening and is retained in connection with the sheet metal panel. Thereafter, the pierce nut provides an attachment point for the article or product being manufactured from the sheet metal panel.

While pierce nut installation heads have been in use for many decades, there is a continuing need to improve these devices. As in the case of any piece of factory tooling or equipment, there is a desire to reduce the number of components comprising the device. In addition to reducing costs, a reduction in components further tends to produce benefits in terms of reliability and serviceability.

During the installation process, the die platens are forced to stroke toward and away from each other. As mentioned previously, the pierce nut installation head is installed within the die cavity. There are advantages to be derived through reducing the stroke distance necessary for the die platens. Such a reduction stroke distance directly translates to a reduction in steel components comprising the die.

In certain prior art pierce nut installation heads, the last nut of a strip of pierce nuts was often not fed and installed onto the sheet metal panel. This produced waste. There is always a desire to reduce the amount of scrap produced in the process of using the pierce nut installation head.

For serviceability reasons, it is desirable to enable the pierce nut installation head to have certain critical components readily detached to allow inspection, clearing, and servicing of the device. Prior designs have often been very inconvenient to allow such disassembly. Accordingly, there is a need in the art to provide a pierce nut installation head having components which can be readily disassembled.

There are a number of sizes of pierce nuts used for various applications. Such pierce nuts vary in terms of their height and perimeter dimensions. Ideally, a pierce nut installation head would be capable of accommodating a range of different pierce nut configurations.

Factory equipment should ideally operate for extended periods without service requirements. Assuring high levels of quality is an aim for every factory operation. In the case of pierce nut installation heads, it is desirable that these devices operate in a trouble-free manner with a long operating lifetime. Moreover, it is important that each nut be properly installed in the sheet metal panel.

SUMMARY OF THE INVENTION

The pierce nut installation head of the present invention provides a number of features beyond that in accordance with the prior art and addresses the previously noted needs for such devices. Through the use of unique plunger design and the appropriate selection of the cam surface of the base component, the height of the head can be reduced. Moreover, the die press stroke needed to produce the installation may also be reduced in accordance with the present invention.

Various critical components of the assembly can be readily disassembled through the use of quick release type connections. These allow the device to be easily cleared of jammed nuts or for other inspection or service requirements.

Through the use of a special feed pawl, the device becomes capable of feeding every pierce nut in the strip, including the last nut. Nuts of various dimensions may be used based on the selection of various head design features and parameters, including a novel slide ramp angle.

Reliability is achieved in accordance with the present invention through numerous features. Included are particular features in the nut control system which supports the pierce nuts during the installation process and assures that they are oriented properly with respect to the sheet metal panel.

Additional benefits and advantages of the present invention will become apparent to those skilled in the art to which the present invention relates from the subsequent description of the preferred embodiment and the appended claims, taken in conjunction with the accompanying drawings.

BRIEF DESCRIPTION OF THE DRAWINGS

FIG. 1 is a side cross sectional view through a pierce nut installation head in accordance with this invention;

FIG. 2 is a rear view partially in section of the nose cover of the device shown in FIG. 1;

FIG. 3 is an end view of the lower assembly of the device of this invention;

FIG. 13 is a top view of the housing body;

FIG. 14 is a side view of the housing body;

FIG. 15 is an end view taken in the direction of arrow 15 from FIG. 14;

FIG. 16 is an end view taken in the direction of arrow 16 of FIG. 14.

DETAILED DESCRIPTION OF THE INVENTION

Figure 5:
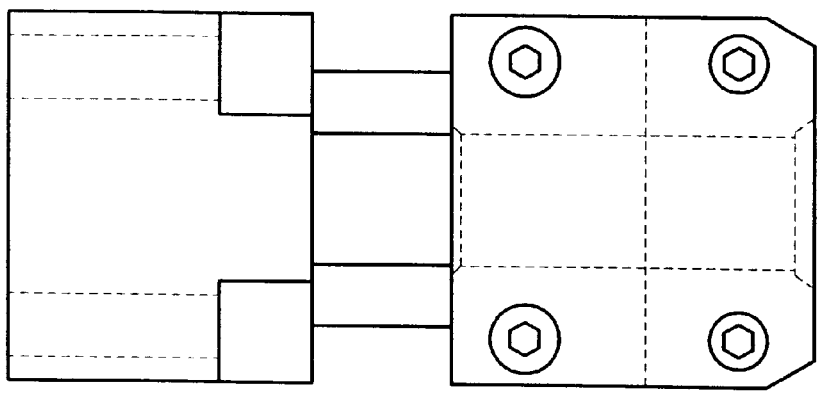
FIG. 5 is a front view taken in the direction of arrow 5 of FIG. 1.

With particular reference to FIG. 1, pierce nut installation head 10 is shown in accordance with this invention and is generally designated by reference number 10. Pierce nut installation head 10 comprises a number of significant subassemblies and components, including base assembly 12 and lower assembly 14. Installation head is mounted to upper die 16 (which may also be a die shoe) and is used for installing pierce nuts 18 onto an associated sheet metal panel 19.

As best shown in FIG. 1, upper die 16 provides a mounting surface for installation of pierce nut installation head 10. Upper die 16, in addition to providing associated fastener bores, further includes counter bore 20 having bore sections 22 and 24.

Figure 7:
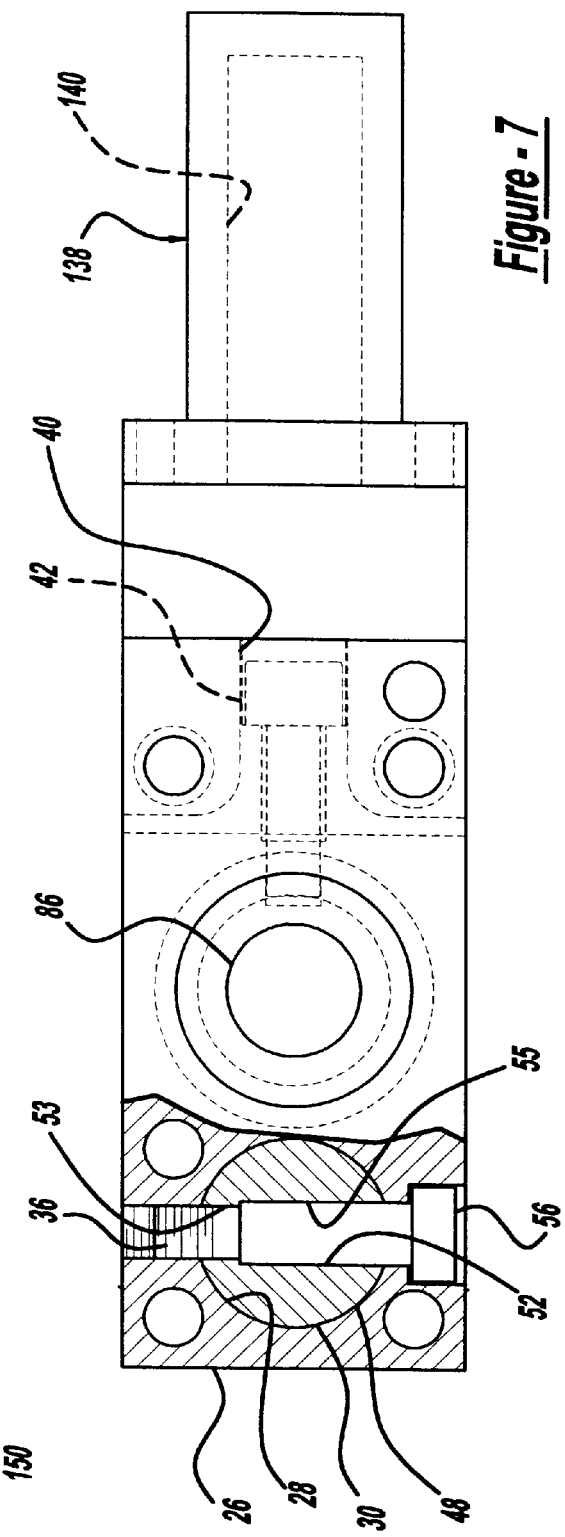
FIG. 7 is a top view, partially in section of the installation head of FIG. 1.

As best shown by FIGS. 1 and 7, base assembly 12 includes base component 26 which is mounted to upper die 16. This direct mounting differs from the prior art in which a backing plate or other component is placed between the upper die and the base assembly. Base 26 forms counter bore 28 which is provided to accommodate shouldered plunger 30. Counter bore 28 is a through bore, opening at both the top and bottom surfaces of base 26. Counter bore 28 forms bore sections 32 and 34, with bore section 34 having a larger diameter. Base cross bore 36 intersects bore section 32. Base 26 further defines shank bore 38. Counter bore 40 receives cap screw 42, which is used for retaining base assembly 12 and lower assembly 14 in an assembled condition, as will be described in more detail in the following sections. Slide ramp 44 acts as a cam surface as will also be described in further detail in the following sections.

Shouldered nut plunger 30 includes a downwardly projecting shank portion 46 and a mounting base which includes an enlarged diameter shoulder 50 and further includes cross bore 52, having bore sections 53 and 55 of differing dimensions. Shank portion 46 has a cross sectional shape which matches the plan view shape of the pierce nuts 18. Base counter bore 28 is configured to closely receive the plunger mounting base 48. Significantly, shoulder 50 is received within bore section 34 and radial surface 54 formed between the bore sections 32 and 34 provides a surface for restraining forces on the device during its use, as will be described in further detail. Cap screw 56 is installed through cross bores 36 and 52 to maintain plunger 30 in an installed condition with base 26. Cap screw 56 has an outside diameter which matches the diameter sections 53 and 55 of bore 52. This configuration enables the plunger 30 to be installed in base 26 in only one desired rotated position. In other words, cap screw 56 may only be installed into bore 52 in only one direction. Bushing 58 is positioned within shank bore 38. Bushing 58 provides a bearing surface for additional components of the assembly. Bushing 58 features a bore 60 through which cap screw 42 passes.

Lower assembly 14 includes a number of individual components including nut track 62. Nut track 62, particularly illustrated in FIGS. 6 and 10 through 12, has an elongated channel which forms nut track groove 64 which accommodates nut strip 66. Nut track groove 64 has a flared entrance 65 and to accommodate a smooth infeed of pierce nut strip 66. The lower surface of nut track 62 is hollowed forming cavity 63 to provide clearance for restrictor 68. Cavity 63 opens at the bottom surface of nut track 62 such that restrictor 68 is exposed. Restrictor 68 is an elongated "T"-shaped lever which pivots about pin 70. Springs 72 acting at one end of restrictor 68 urges the ramped tooth 74 of the restrictor to be urged in an upwardly direction. Restrictor tooth 74 interacts with pierce nuts 18 such that when the pierce nuts are moved in the left-hand direction as shown in FIG. 1, causing the ramped tooth 74 to rotate the restrictor 68 until the next threaded hole of a pierce nut 18 is presented at which position the ramped tooth 74 enter the threaded bore. Restrictor 68 prevents the pierce nuts 18 from moving in any direction but advancing toward the left-hand direction. Nut track 62 further forms cavity 76 which accommodates nut control elements which will be described further. Cavity 76 forms a portion of nose chamber 150 through which the pierce nuts 18 are moved during their installation.

Nut track 62 is mounted to body housing 78 which is best shown with reference to FIGS. 1 and 13 through 16. As best shown in FIG. 15, housing body 78 defines a T-slot 80. Bore 82 and cross bore 84 accommodate and mount the shank element 86. Housing body 78 further forms open slot 88 which is provided for slide assembly 90.

Figure 4:
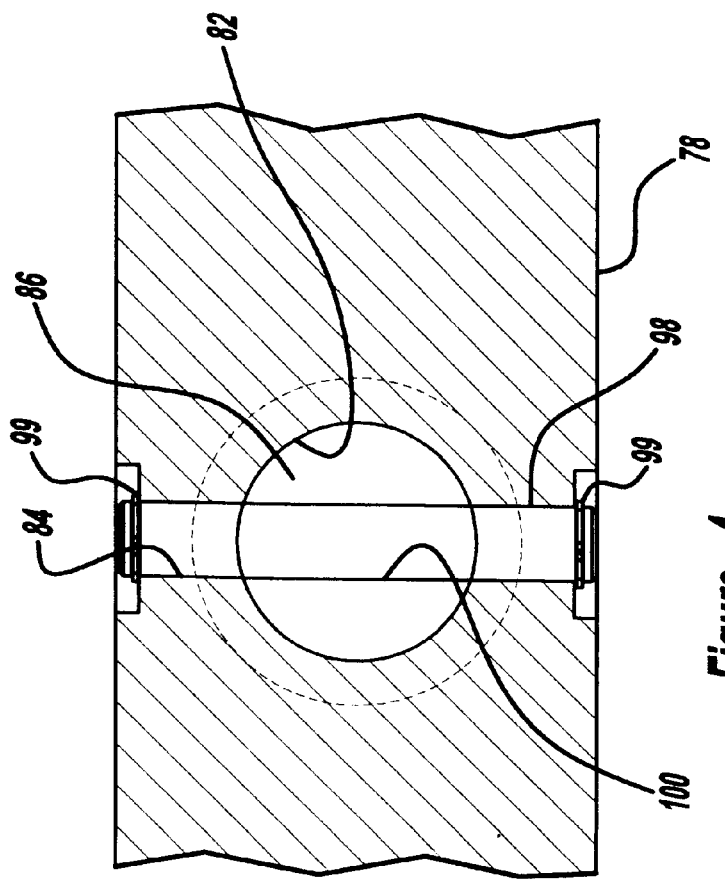
FIG. 4 is a cross sectional view through the housing body showing the connection with the shank component.
Figure 6:
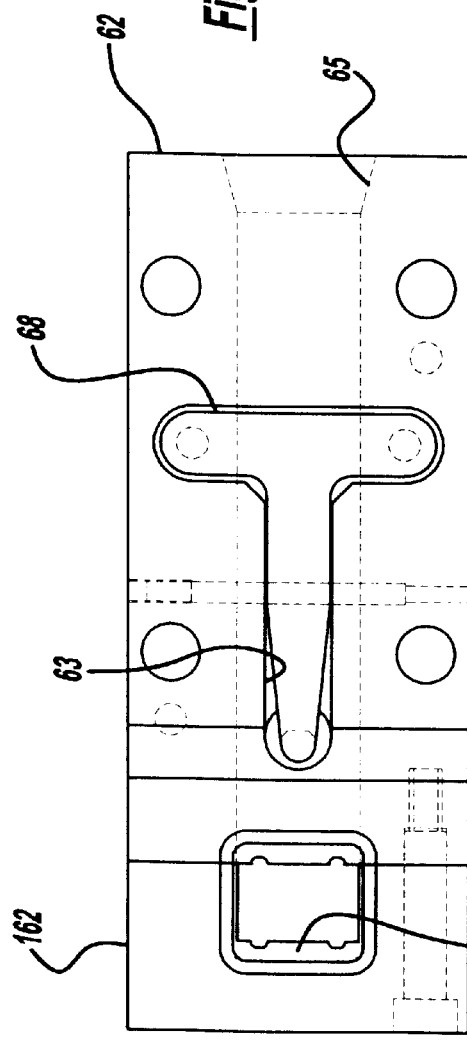
FIG. 6 is a bottom view of the lower assembly shown in FIG. 1.

Shank 86 includes internal bore 92, mounting post 94, and slot 96. Shank 86 is received within upper die bore section 24 and is allowed to stroke vertically with respect to upper die 16. As shown in FIG. 4, shank mounting post 94 is received within. body housing bore 82. Attachment pin 98 is passed through housing body cross bore 82 and shank mounting post mounting bore 100. Pin 98 is retained by a pair of snap rings 99. Shank 86 is received within bushing 58 which provides smooth vertical stroking motion of shank 86 within the bushing. Shank slot 96 is provided to receive the end of cap screw 42. Since the slot is not open ended, once the cap screw 42 is in position, shank 86 may move vertically only within a prescribed range as determined by the vertical length of slot 96. However, upon removal of cap screw 42, shank 86 may be withdrawn from its connection with base assembly 12. This allows rapid and convenient servicing for head 10. By loosening or removing a single fastener; namely, cap screw 42, lower assembly 14 is free to drop free from base assembly 12. Return spring 102 is mounted to be received within upper die bore section 22 and shank internal bore 92. Return spring 102 exerts an extension force urging shank 86 to its lowermost position which is illustrated in FIG. 1. An alternative design (not shown) would use a pneumatic cylinder to cause the stroking motion between base assembly 12 and lower assembly 14.

Slide assembly 90 is carried within body housing 78 and specifically within open slot 88. Slide assembly 90 is carried for slidable motion from the position shown in FIG. 1 to a stroked position in the right-handed direction from that shown in FIG. 1. Slide assembly includes slide body 104, best shown with reference to FIGS. 1 and 3. Slide body 104 includes protruding ribs 106 that fit within housing body slot 80. Slide body 104 mounts roller 108 which is oriented to engage with slide ramp 44. Roller 108 is carried on shaft 110 and is retained by snap rings 109. Vertically oriented bore 112 is provided for pawl plunger 114 and spring 116. A horizontally oriented passageway 118 is provided for feed pawl 120. Feed pawl 120 pivots about pin 122. Spring 116 urges plunger 114 in a vertically upward position. Plunger 114 is in-turn connected with an end of feed pawl 120. This interconnection causes feed pawl 120 to be biased to rotate in the counterclockwise direction. This direction of biasing urges feed pawl end 124 in a downward position where it is provided to engage with nuts 18.

As best shown in FIG. 1, feed pawl end 124 includes a downwardly projecting tooth 126 which is provided to engage with the threaded bores of pierce nuts 18. As will be more thoroughly explained in the following discussion, the end surface 128 of feed pawl 120 is also capable of engaging a side surface of a pierce nut 18 when the last pierce nut of a pierce nut strip 66 is encountered. The range of motion of feed pawl 120 is restricted by finger 130 which limits the downward displacement of feed pawl end 124.

Figure 8:
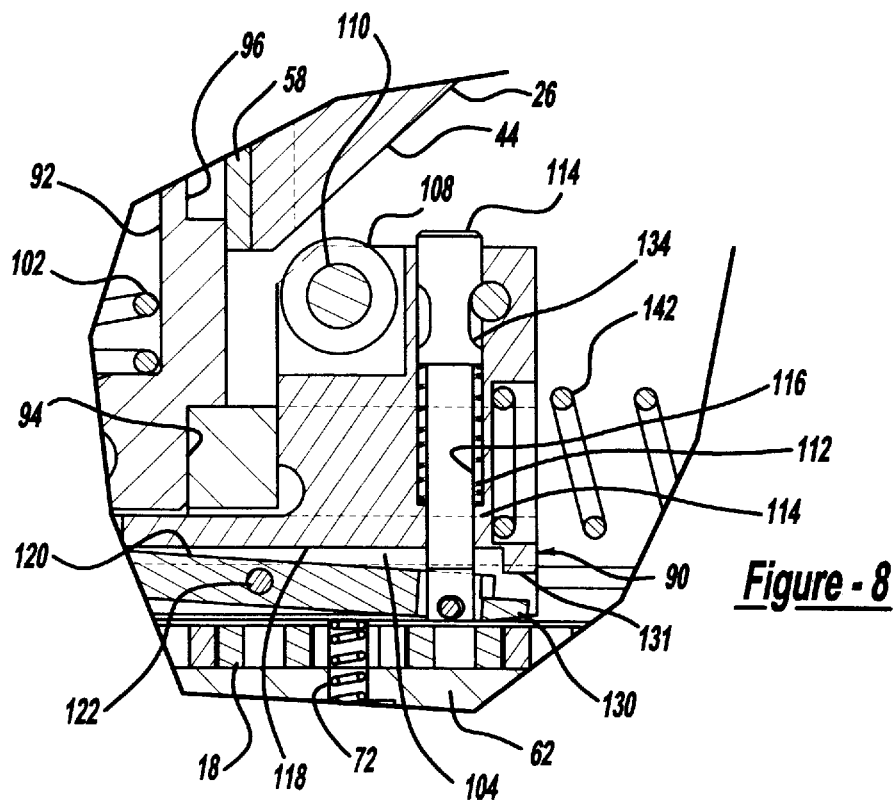
FIG. 8 is a partial side sectional view showing in greater detail certain components of the base and slide assembly.

As shown in FIGS. 1 and in more detail in FIG. 8, plunger 114 is pinned to an end of feed pawl 120. Plunger 114 is permitted to stroke vertically over a limited range corresponding to a range of motion desired for feed pawl 120. Since it is necessary to release the biasing force acting on feed pawl 120 when it is desired to remove a nut strip 66 from track 62, plunger 114 is provided with a quick release mechanism. By simultaneously depressing plunger 114 and restrictor 68, the nut strip 66 can be easily removed through nut track 64. Release is achieved by a simultaneous downward depressing of plunger 114 and an upward force on restrictor 68 which can be provided by a pinching motion of the hand of an operator. This allows convenient one-hand release operation.

Figure 9:
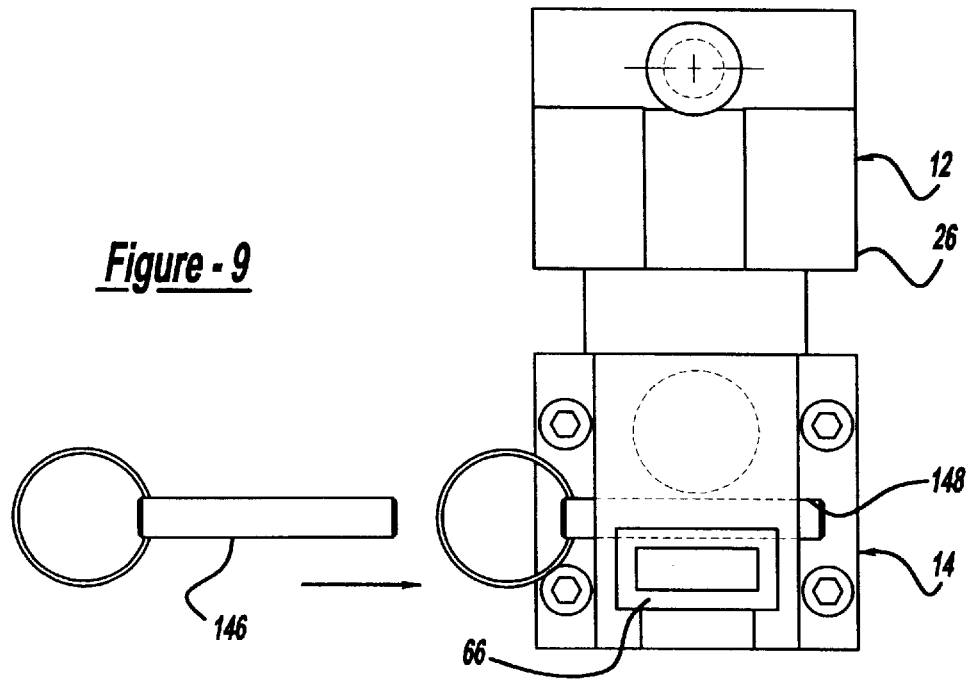
FIG. 9 is an end view in the direction of arrow 9 from FIG. 1 particularly showing the manner of enabling a nut strip to be moved through the assembly.
Figure 10:
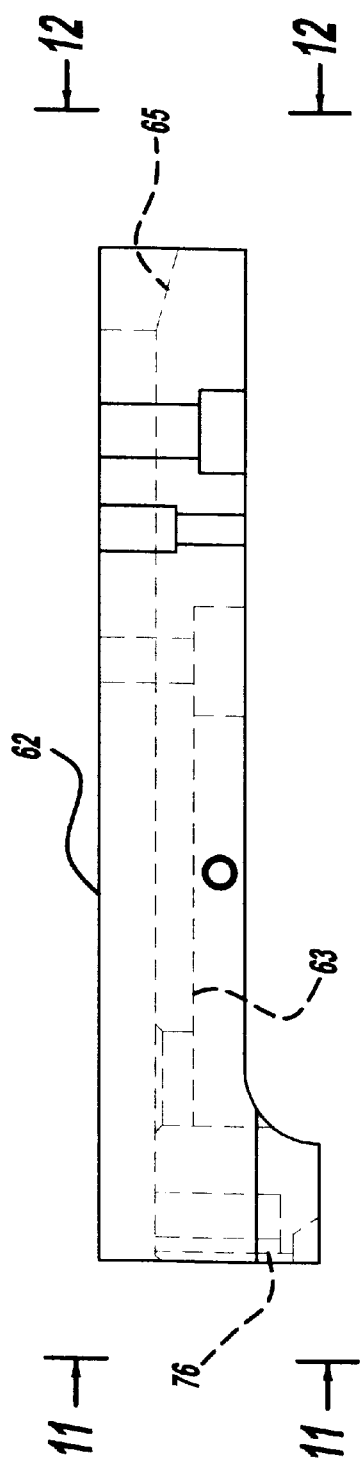
FIG. 10 is a side view of the nut track component shown in FIG. 1.
Figure 12:
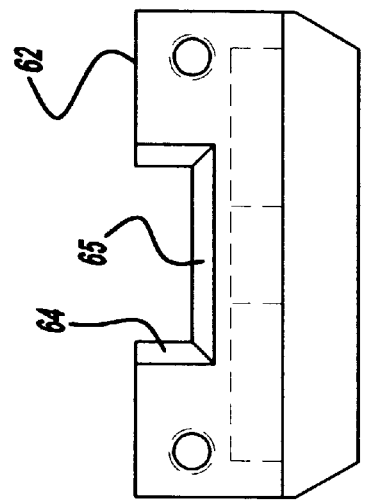
FIG. 12 is an end view taken in the direction of arrow 12 of FIG. 10.
Figure 11:
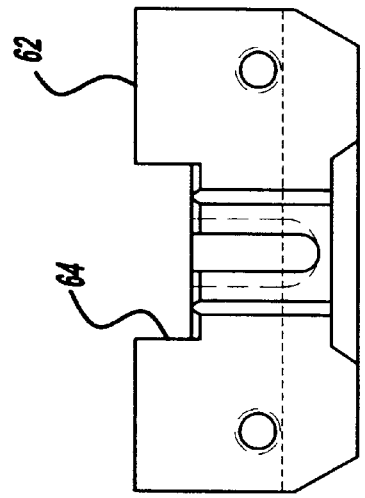
FIG. 11 is an end view taken in the direction of arrow 11 of FIG. 10.

Spring and chute housing 138 includes spring bore 140 having spring 142 installed therein. Spring and chute housing 138 is fastened to nut track 62 and housing 78. When this fastening occurs, spring 142 urges slide assembly 90 toward its left-hand stop position as shown in FIG. 1. Spring and chute housing 138 also provides a passageway for strip carrier 144 which is a polymeric carrier through which nut strips 66 are placed. As best shown in FIG. 9, pin 146 passes through a corresponding bore 148 and engages with a radius formed in strip carrier 144. When spring strip carrier 144 is installed, pin 146 is put in position to interlock the carrier in position. Carrier 144 may be quickly removed by removing pin 146 which is conveniently provided with a pull ring.

When pierce nuts 18 are placed within nut track channel 64, they are urged to the left-hand position during actuation of the device. The pierce nut 18 in the left-hand most position shown in FIG. 1, is in position to be installed onto an associated sheet metal panel. As shown, this nut is positioned within driving passageway 150. As the pierce nut 18 is driven into an installation position, it moves from the position shown in FIG. 1 downwardly through nose chamber 150. Since it is necessary to ensure that pierce nut 18 remains in the orientation shown, namely oriented horizontally as it moves downwardly through nose chamber 150, guide block 152 is provided. Guide block 152 is biased through a urethane pad 154. In its normal position, guide block 152 presents a nose chamber width which is slightly narrower than the width of pierce nut 18. As pierce nut 18 is stroked downwardly through nose chamber 150, guide block 152 is capable of displacing and compressing urethane pad 154. This ensures that the pierce nut 18 is supported during its entire movement through nose chamber 150.

Now with reference to FIG. 2, nose cover 162 is shown which forms a portion of nose chamber 150. Nose cover 162 is bolted to both nut track 62 and housing body 78. Nose cover 162 retains a pair of opposed nut fingers 156 which rotate about pins 158. Nut fingers 156 are biased by springs 160. FIG. 2 shows a pierce nut 18 in the position illustrated in FIG. 1 about to be stroked into an installed condition attached to a sheet metal panel. Nut fingers 156 support the nut in the desired horizontal orientation. When, however, the pierce nut 18 is forced downwardly through nose chamber 150, nut fingers 156 are caused to rotate and release their grasping of pierce nut 18. Nose cover 162 further includes proximity sensor 163 which provides an electrical signal of the presence of a pierce nut 18 in the nose chamber 150.

With reference to the previously described elements of pierce nut installation head 10, the operation of the device will now be described. FIG. 1 illustrates the positioning of the components in a position just prior to an installation sequence. In this position, spring 102 urges lower assembly 14 to its lowermost position. In this position, shoulder nut plunger 30 is positioned over pierce nut 18 about to be installed onto an associated panel. Spring 142 urges slide assembly 90 to its left-hand most position where it is bottomed against housing body 78.

As the associated press is cycled, nose surface 164 engages the workpiece as upper die 16 is moved toward the sheet metal panel. This process causes compression of the head 10 and strokes lower assembly 14 toward base assembly 12. During this process, plunger 30 engages pierce nut 18 and forces it downwardly through nose chamber 150. As previously explained, guide block 152 is compressed as the pierce nut 18 passes downwardly through the chamber. Individual pierce nuts 18 are normally attached to one another by a frangible connection such as an embedded wire. The interaction between plunger 30 and pierce nut 18 causes this connection to be severed. Nut fingers 156 release their grasping of the pierce nut 18 as it is displaced downwardly.

During the previously described process, when a pierce nut 18 is moved in the left-hand direction into nose chamber 150, it reached a positive mechanical stop or lateral stop surface when it contacts proximity sensor 163. When nut 18 is pushed downwardly through nose chamber 150, it does not shift laterally since it is always maintained in contact with the lateral stop surface formed by sensor 163. This is believed to provide enhanced position control over piece nut 18 in its installed position as contrasted with prior art designs in which the lateral stop surface is yieldable, like guide block 152.

The stroking of installation head 10 during closing of the press also causes roller 108 to engage with guide ramp 44. This interaction causes slide assembly 90 to stroke to a right-hand position where roller 108 is oriented in the phantom line position shown in FIG. 1. This motion causes slide assembly 90 to stroke 70 the right, compressing spring 142. This motion also causes feed pawl end 124 to move to engage the next nut in nut strip 66 causing tooth 126 to drop into a pierce nut threaded bore. Feed pawl 120 is able to stroke away from the nut it previously engaged since tooth 126 has a leading edge surface 127 which is ramped.

The angle which slide ramp 44 forms with respect to a horizontal plane is determined to provide a number of attributes. There is a direct geometric relationship between the slide ramp angle, the stroke distance of the press, and the horizontal motion of slide assembly 90. The horizontal displacement of slide assembly 90 must accommodate pierce nuts 18 over a range of dimensions. It is permissible for feed pawl 120 to stroke in the right-hand direction further than necessary since upon its change in direction that will properly engage a pierce nut 18. In the case of the present invention, an angle of 42.5° is chosen for slide ramp 44 with respect to the horizontal.

Once pierce nut 18 reaches its position in engagement with the associated sheet metal panel, very high compressive loading forces are placed upon shouldered plunger 30. This compression force is efficiently restrained through the interaction between plunger shoulder 50 and radial wall 54.

After installation of a pierce nut 18, the press is again opened. During this process, spring 102 urges lower assembly 14 back to the position shown in FIG. 1. This process also causes slide assembly 90 to again move to its left-hand most position under the influence of spring 142. This process also urges nut strip 66 to be advanced in a left-hand position indexing to move the strip to one nut position displacement.

In the case where the last pierce nut 18 of nut strip 66 is within the nut groove 64, feed pawl 120 is able to advance that last nut by dropping down to position where its end surface 128 engages the right-hand side of the last pierce nut 18. This allows full utilization of each nut strip 66.

While the above description constitutes the preferred embodiment of the present invention, it will be appreciated that the invention is susceptible to modification, variation and change without departing from the proper scope and fair meaning of the accompanying claims.

We claim:

1. A pierce nut installation head for use in a die press between an upper and a lower die for installing pierce nuts onto a panel, comprising:

a base assembly affixed to the upper die including a base forming a first counter-bore forming a radial surface between two diameter sections of the first counter-bore, and a second bore;

a nut plunger having an elongated shank having a tip for contacting and pressing a pierce nut against the panel, and having a mounting base received within the base first counter-bore, the nut plunger mounting base having a shoulder and a base section having a diameter smaller than the shoulder with the base shoulder contacting and seating against the radial surface whereby compression forces exerted on the nut plunger during installation of the pierce nut onto the panel are primarily restrained by the base at the radial surface; and a lower assembly having a nut track for receiving a strip of the pierce nuts, a shank received by the base second bore for allowing the lower assembly to stroke vertically relative to the base assembly, and a slide assembly for stroking horizontally during the vertical stroking of the lower assembly relative to the base assembly for advancing the pierce nut strip during operating cycles of the head.

2. The pierce nut installation head according to claim 1 further comprising: the base first counter-bore extending through the base and opening at a top and bottom surface of the base.

3. The pierce nut installation head according to claim 1 further comprising the base further having a cross-bore intersecting at a right angle to the base first counter-bore and the nut plunger having a nut plunger cross-bore, and a screw installed within the base cross-bore and the nut plunger cross-bore to affix the nut plunger to the base.

4. The pierce nut installation head according to claim 3 further comprising the nut plunger cross-bore having two different diameter sections which cooperate with the screw such that the nut plunger may be installed into the base first counter-bore in only one indexed position.

5. The pierce nut installation head according to claim 1 wherein the base assembly is mounted to and contacts the upper die.

6. A pierce nut installation head for use in a die press between an upper and a lower die for installing pierce nuts onto a panel, comprising:

a base assembly affixed to the upper die including a base forming a first base bore, and a second base bore;

a nut plunger having an elongated shank having a tip for contacting and pressing a pierce nut against the panel, and having a mounting base received within the first base bore;

a lower assembly having a nut track for receiving a strip of the pierce nuts, a shank received by the base second bore for allowing the lower assembly to stroke vertically relative to the base assembly, and a slide assembly carried by the lower assembly for stroking horizontally during the vertical stroking of the lower assembly relative to the base assembly for advancing the pierce nut strip during operating cycles of the head, the lower assembly having a feed pawl pivoting about a pin between a first end and a second end, the first end having a finger for engaging the pierce nuts and a pawl plunger attached to the feed pawl second end, the pawl plunger slidably fitted within a vertical bore formed by the slide assembly, a first spring acting on the pawl plunger for exerting a force on the feed pawl second end to urge the feed pawl first end to engage the pierce nuts, the pawl plunger extending upwardly through the vertical bore and protruding from the vertical bore whereby a downward externally applied force on the pawl plunger causes the feed pawl first end to disengage the pierce nuts;

a restrictor mounted within a cavity opening at the lower surface of the lower assembly, the restrictor mounted to pivot within the cavity and having a ramped tooth at a first restrictor end and having a second spring acting on a second restrictor end for biasing the first restrictor end in an upward direction for engaging the pierce nuts, the restrictor second end being externally accessible enabling an upward externally applied force to be applied to the restrictor second end urging the first restrictor end to disengage the pierce nuts; and the pawl plunger and the restrictor are located relative to one another to permit an operator to simultaneously apply the external forces on the pawl plunger and the restrictor to disengage the pawl and the restrictor from the pierce nuts.

7. A pierce nut installation head according to claim 6 wherein the pawl plunger is biased by the first spring in the upward direction in the normal operating condition.

8. A pierce nut installation head for use in a die press between an upper and a lower die for installing pierce nuts onto a panel, comprising:

a base assembly affixed to the upper die including a base forming a first base bore, and a second base bore;

a nut plunger having an elongated shank having a tip for contacting and pressing a pierce nut against the sheet metal panel, and having a mounting base received within the first base bore; and a lower assembly having a nut track with a nut track groove for receiving a strip of the pierce nuts, a shank received by the base second bore for allowing the lower assembly to stroke vertically relative to the base assembly, and a slide assembly for stroking horizontally during the vertical stroking of the lower assembly relative to the base assembly for advancing the pierce nut strip during operating cycles of the head, a nose cover affixed to the nut track to form a nose chamber with the pierce nuts advancing along the nut track groove in an advancing direction during successive cycles, the nose chamber forming a hard lateral stop surface for the pierce nuts when a pierce nut is advanced into the nose chamber to position the pierce nut in the nose chamber and the nose chamber having a guide block positioned to press against the pierce nut at an edge thereof opposite the edge engaged by the hard lateral stop surface, the guide block being yieldably mounted to exert a clamping force against the piece nut as it is forced to move downwardly through the nose chamber while being driven by the nut plunger.

9. A pierce nut installation head according to claim 8 wherein the hard lateral stop surface is formed by a proximity sensor.

10. A pierce nut installation head according to claim 8 wherein the nut undergoes substantially no lateral movement as it is advanced downwardly through the nose chamber while being driven by the nut plunger.

11. A pierce nut installation head for use in a die press between an upper and a lower die for installing pierce nuts onto a panel, comprising:

a base assembly affixed to the upper die including a base forming a first counter-bore forming a radial surface between two diameter sections of the first counter-bore, and a second bore;

a nut plunger having an elongated shank having a tip for contacting and pressing a pierce nut against the panel, and having a mounting base received within the base first counter-bore, the nut plunger mounting base having a shoulder and a base section having a diameter smaller than the shoulder with the base shoulder contacting and seating against the radial surface whereby compression forces exerted on the nut plunger during installation of the pierce nut onto the panel are primarily restrained by the base at the radial surface;

a lower assembly having a nut track for receiving a strip of the pierce nuts, a shank received by the base second bore for allowing the lower assembly to stroke vertically relative to the base assembly, and a slide assembly carried by the lower assembly for stroking horizontally during the vertical stroking of the lower assembly relative to the base assembly for advancing the pierce nut strip in an advancing direction during operating cycles of the head into a nose chamber, the nose chamber forming a hard lateral stop surface for the pierce nuts when a pierce nut is advanced into the nose chamber to position the pierce nut in the nose chamber and the nose chamber having a guide block positioned to press against the pierce nut at an edge thereof opposite the edge engaged by the hard lateral stop surface, the guide block being yieldably mounted to exert a clamping force against the piece nut as it is forced to move downwardly through the nose chamber while being driven by the nut plunger, the lower assembly having a feed pawl pivoting about a pin between a first end and a second end, the first end having a finger for engaging the pierce nuts and a pawl plunger attached to the feed pawl second end, the pawl plunger slidably fitted within a vertical bore formed by the slide assembly, a first spring acting on the pawl plunger for exerting a force on the feed pawl second end to urge the feed pawl first end to engage the pierce nuts, the pawl plunger extending upwardly through the vertical bore and protruding from the vertical bore whereby a downward externally applied force on the pawl plunger causes the feed pawl first end to disengage the pierce nuts;

a restrictor mounted within a cavity opening at the lower surface of the lower assembly, the restrictor mounted to pivot within the cavity and having a ramped tooth at a first restrictor end and having a second spring acting on a second restrictor end for biasing the first restrictor end in an upward direction for engaging the pierce nuts, the restrictor second end being externally accessible enabling an upward externally applied force to be applied to the restrictor second end urging the first restrictor end to disengage the pierce nuts; and the pawl plunger and the restrictor are located relative to one another to permit an operator to simultaneously apply the external forces on the pawl plunger and the restrictor to disengage the pawl and the restrictor from the pierce nuts.

12. The pierce nut installation head according to claim 11 further comprising: the base first counter-bore extending through the base and opening at a top and bottom surface of the base.

13. The pierce nut installation head according to claim 11 further comprising the base further having a cross-bore intersecting at a right angle to the base first counter-bore and the nut plunger having a nut plunger cross-bore, and a screw installed within the base cross-bore and the nut plunger cross-bore to affix the nut plunger to the base.

14. The pierce nut installation head according to claim 13 further comprising the nut plunger cross-bore having two different diameter section which cooperate with the screw such that the nut plunger may be installed into the base first counter-bore in only one indexed position.

15. The pierce nut installation head according to claim 11 wherein the base assembly is mounted to and contacts the upper die.

16. A pierce nut installation head according to claim 11 wherein the pawl plunger is biased by the spring in the upward direction in the normal operating condition.

17. A pierce nut installation head according to claim 11 wherein the hard lateral stop surface is formed by a proximity sensor.

18. A pierce nut installation head according to claim 11 wherein the nut undergoes substantially no lateral movement as it is advanced downwardly through the nose chamber while being driven by the nut plunger.

* * * * *